(No Model.)
W. & E. SCOTT & H. R. CORNELL.
FARM GATE.
No. 463,554. Patented Nov. 17, 1891.
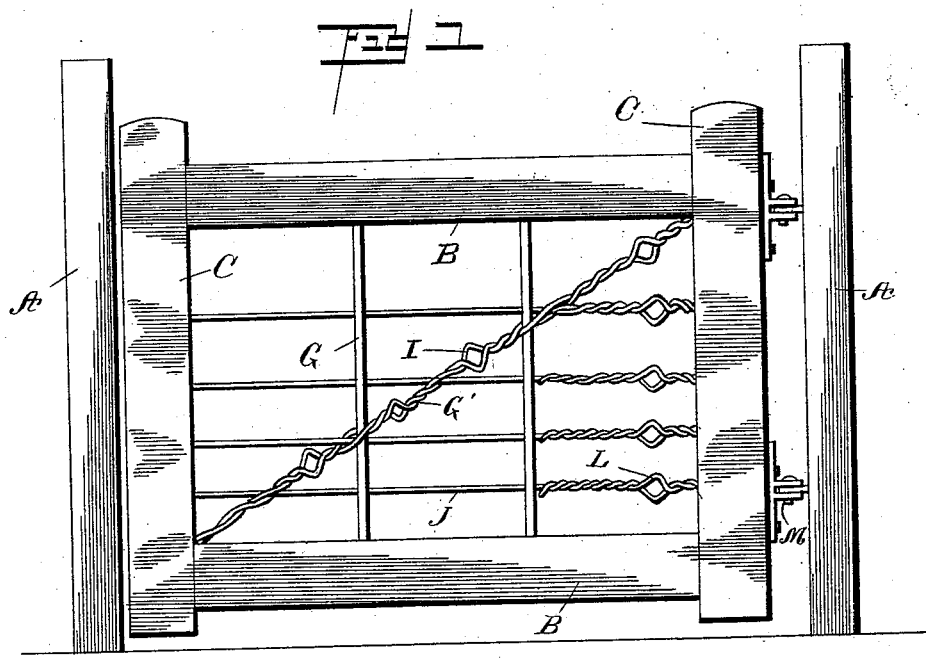
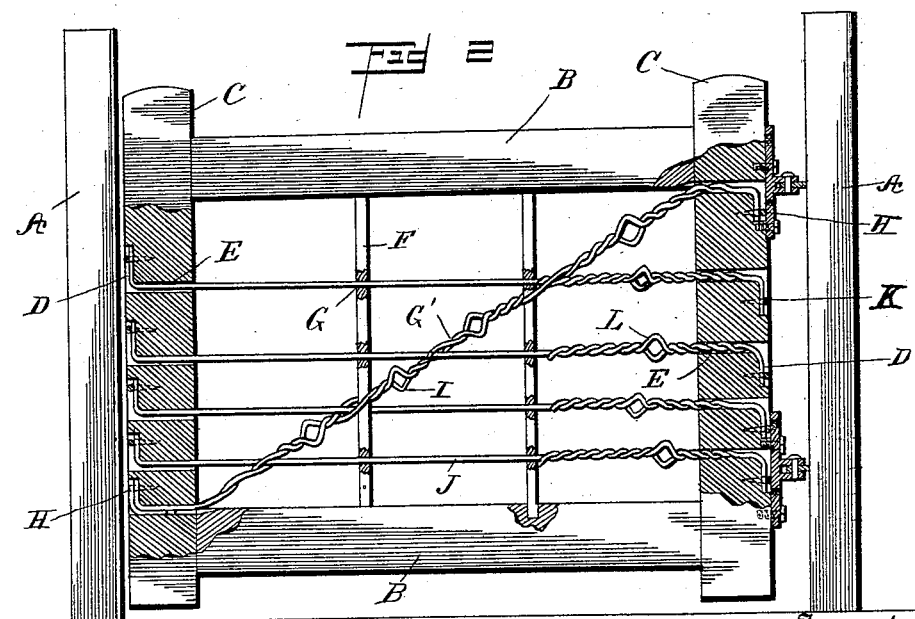
Witnesses
Inventors,
William Scott, Edward Scott,
and Herbert R. Cornell,
By their Attorney
R. W. Bishop.

UNITED STATES PATENT OFFICE.

WILLIAM SCOTT AND EDWARD SCOTT, OF JACKSON, AND HERBERT R. CORNELL, OF LIBERTY, INDIANA.

FARM-GATE.

SPECIFICATION forming part of Letters Patent No. 463,554, dated November 17, 1891.

Application filed December 12, 1890. Serial No. 374,518. (No model.)

*To all whom it may concern:*

Be it known that we, WILLIAM SCOTT and EDWARD SCOTT, residing at Jackson, in the county of White and State of Indiana, and HERBERT R. CORNELL, residing at Liberty, in the county of White and State of Indiana, have invented certain new and useful Improvements in Farm-Gates, of which the following is a full, clear, and exact description.

Our invention relates to improvements in farm-gates; and it consists in a certain novel construction whereby a very strong and durable gate is produced, as will be hereinafter first fully described, and then pointed out in the claim.

In the annexed drawings, which fully illustrate our invention, Figure 1 is an elevation of a gate embodying our improvements, and Fig. 2 is a vertical longitudinal section of the same.

The gate-posts A are of the usual or any preferred construction and may be of any suitable material.

The frame or outer portion of the gate consists of the upper and lower horizontal bars B B and the vertical end bars C, as clearly shown. The said end bars are provided with the recesses D in their outer sides and the slots E leading transversely through the bars from the said recesses, while metallic stay-bars F are secured vertically between the upper and lower horizontal bars at intermediate points of the gate and are provided with the perforations or openings G in alignment with the slots E in the end bars of the gate.

A double brace-wire G' is extended from the inner upper corner of the gate to the lower outer corner of the same, and has its ends inserted through the corner slots E and secured in the recesses registering therewith by the staples H. The branches of this brace-wire are twisted around each other, as clearly shown in the drawings, so as to lend additional strength to the brace, and at intervals along their length they are separated to form the loops or rings I, which may be engaged by a suitable tool to still further twist the wires, and thus compensate for the sagging of the gate.

Horizontal brace-wires J are extended between the ends of the gate and have their ends inserted through the slots E and secured in the recesses D by staples K, as shown. The inner ends of these horizontal brace-wires are bent back on themselves and carried outward, the two portions of the wires being twisted around each other and provided with a loop L to permit the engagement of a suitable twisting-tool.

The advantages of our gate are thought to be obvious from the foregoing description when considered in connection with the accompanying drawings. It will be noticed that the gate constructed by us is very simple in its arrangement and is composed of very few parts, and that its elements are of such a nature as to reduce the weight of the gate to a minimum. The intermediate stay-bars hold the horizontal wires in straight lines, and by twisting the wires as described any and all sagging of the gate can be easily and effectually overcome. The manner of securing the ends of the wires aids materially in preventing their withdrawal and effectually prevents them from being loosened by the strain to which they are subjected.

Having thus described our invention, what we claim, and desire to secure by Letters Patent, is—

The combination of the end bars having recesses in their outer sides and slots leading from the said recesses, the upper and lower bars connecting the end bars, the vertical stay-bars arranged between the upper and lower bars and provided with perforations in alignment with the slots in the end bars, wires inserted through the said slots and the perforations in the stay-bars and having their ends secured in the said recesses, the inner ends of said wires being bent back and twisted around the main portions of the wires and provided with loops, and a brace-wire extending from the inner upper corner to the outer lower corner of the gate, provided with loops and having its ends secured in recesses in the end bars of the same.

WILLIAM SCOTT.
EDWARD SCOTT.
HERBERT R. CORNELL.

Witnesses:
JOHN E. WORTHINGTON,
RICHARD H. CORNELL.